US009940234B2

(12) United States Patent
Davis

(10) Patent No.: US 9,940,234 B2
(45) Date of Patent: Apr. 10, 2018

(54) AGGRESSIVE DATA DEDUPLICATION USING LAZY GARBAGE COLLECTION

(71) Applicant: Pure Storage, Inc., Mountain View, CA (US)

(72) Inventor: John D. Davis, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 324 days.

(21) Appl. No.: 14/670,288

(22) Filed: Mar. 26, 2015

(65) Prior Publication Data

US 2016/0283372 A1 Sep. 29, 2016

(51) Int. Cl.
*G06F 12/02* (2006.01)
*G06F 3/06* (2006.01)

(52) U.S. Cl.
CPC ........ *G06F 12/0261* (2013.01); *G06F 3/0616* (2013.01); *G06F 3/0641* (2013.01); *G06F 3/0652* (2013.01); *G06F 3/0679* (2013.01); *G06F 2212/7205* (2013.01)

(58) Field of Classification Search
CPC .. G06F 12/0261; G06F 3/0679; G06F 3/0641; G06F 3/0616; G06F 3/0652; G06F 2212/7205
USPC .......................................................... 707/692
See application file for complete search history.

(56) References Cited

U.S. PATENT DOCUMENTS 5,390,327 A 2/1995 Lubbers et al.
5,479,653 A 12/1995 Jones
5,559,957 A * 9/1996 Balk .................. G06F 11/1435 713/2
5,649,093 A 7/1997 Hanko et al.
6,275,898 B1 8/2001 DeKoning
6,535,417 B2 3/2003 Tsuda
6,643,748 B1 11/2003 Wieland
6,681,263 B1 * 1/2004 King .................... G06F 9/4435 707/999.202
6,725,392 B1 4/2004 Frey et al.
(Continued)

FOREIGN PATENT DOCUMENTS

EP 2164006 3/2010
EP 2256621 12/2010
(Continued)

OTHER PUBLICATIONS

Glaser et al., "Lazy Garbage Collection", Software—Practice and Experience, vol. 17(1): pp. 1-4, Jan. 1987.*
(Continued)

*Primary Examiner* — Phuong Thao Cao

(74) *Attorney, Agent, or Firm* — Womble Bond Dickinson (US) LLP

(57) ABSTRACT

A method for extending data lifetime for reference in deduplication is provided. The method includes determining that a quantity of user data has at least a threshold amount of data that is re-created in a storage system. The method includes protecting at least portions of the quantity of user data from erasure by garbage collection in the storage system during a predetermined time interval, wherein the protected at least portions are available for data deduplication of further user data in the storage system during the predetermined time interval.

18 Claims, 8 Drawing Sheets

(56) References Cited

U.S. PATENT DOCUMENTS 6,725,456 B1 * 4/2004 Bruno .................. G06F 9/5011 709/222
6,836,816 B2 12/2004 Kendall
6,985,995 B2 1/2006 Holland et al.
7,032,125 B2 4/2006 Holt et al.
7,051,155 B2 5/2006 Talagala et al.
7,065,617 B2 6/2006 Wang
7,065,618 B1 * 6/2006 Ghemawat ........ G06F 17/30215 707/999.201
7,069,383 B2 6/2006 Yamamoto et al.
7,076,606 B2 7/2006 Orsley
7,107,419 B1 * 9/2006 Ghemawat ........ G06F 17/30067 707/999.202
7,155,728 B1 * 12/2006 Prabhu .................... G06F 9/547 719/310
7,159,150 B2 1/2007 Kenchammana-Hosekote et al.
7,162,575 B2 1/2007 Dalai et al.
7,164,608 B2 1/2007 Lee
7,197,638 B1 * 3/2007 Grawrock ........... G06F 21/6218 705/51
7,222,119 B1 * 5/2007 Ghemawat ........ G06F 17/30171
7,334,156 B2 2/2008 Land et al.
7,379,926 B1 * 5/2008 Belniak .................... G06N 5/00 706/12
7,424,498 B1 9/2008 Patterson
7,424,592 B1 9/2008 Karr et al.
7,480,658 B2 1/2009 Heinla et al.
7,536,506 B2 5/2009 Ashmore et al.
7,558,859 B2 7/2009 Kasiolas et al.
7,613,947 B1 11/2009 Coatney et al.
7,681,104 B1 3/2010 Sim-Tang et al.
7,681,105 B1 3/2010 Sim-Tang et al.
7,730,258 B1 6/2010 Smith et al.
7,743,276 B2 6/2010 Jacobson et al.
7,757,038 B2 7/2010 Kitahara
7,778,960 B1 8/2010 Chatterjee et al.
7,814,272 B2 10/2010 Barrall et al.
7,814,273 B2 10/2010 Barrall
7,818,531 B2 10/2010 Barrall
7,827,351 B2 11/2010 Suetsugu et al.
7,827,439 B2 11/2010 Matthew et al.
7,870,105 B2 1/2011 Arakawa et al.
7,885,938 B1 2/2011 Greene et al.
7,886,111 B2 2/2011 Klemm et al.
7,908,448 B1 3/2011 Chatterjee et al.
7,916,538 B2 3/2011 Jeon et al.
7,941,697 B2 5/2011 Mathew et al.
7,958,303 B2 6/2011 Shuster
7,971,129 B2 6/2011 Watson et al.
7,991,822 B2 8/2011 Bish et al.
8,010,485 B1 8/2011 Chatterjee et al.
8,010,829 B1 8/2011 Chatterjee et al.
8,020,047 B2 9/2011 Courtney
8,046,548 B1 10/2011 Chatterjee et al.
8,051,361 B2 11/2011 Sim-Tang et al.
8,051,362 B2 11/2011 Li et al.
8,060,543 B1 * 11/2011 Ciot ........................ G06F 11/32 707/820
8,082,393 B2 12/2011 Galloway et al.
8,086,634 B2 12/2011 Mimatsu
8,086,911 B1 12/2011 Taylor
8,090,837 B2 1/2012 Shin et al.
8,108,447 B2 * 1/2012 Guo ...................... G06F 3/0608 707/813
8,108,502 B2 1/2012 Tabbara et al.
8,117,388 B2 2/2012 Jernigan, IV
8,126,940 B2 * 2/2012 Bacon ................. G06F 12/0261 707/813
8,140,821 B1 3/2012 Raizen et al.
8,145,838 B1 3/2012 Miller et al.
8,145,840 B2 3/2012 Koul et al.
8,176,360 B2 5/2012 Frost et al.
8,180,855 B2 5/2012 Aiello et al.
8,200,922 B2 6/2012 McKean et al.
8,224,874 B2 * 7/2012 Guo ........................ G06F 3/067 707/813
8,225,006 B1 7/2012 Karamcheti
8,239,618 B2 8/2012 Kotzur et al.
8,244,999 B1 8/2012 Chatterjee et al.
8,305,811 B2 11/2012 Jeon
8,315,999 B2 11/2012 Chatley et al.
8,327,080 B1 12/2012 Der
8,341,300 B1 * 12/2012 Karamcheti ........ G06F 13/1642 710/5
8,375,146 B2 2/2013 Sinclair
8,402,152 B2 3/2013 Duran
8,412,880 B2 4/2013 Leibowitz et al.
8,423,739 B2 4/2013 Ash et al.
8,429,436 B2 4/2013 Filingim et al.
8,473,778 B2 6/2013 Simitci et al.
8,479,037 B1 7/2013 Chatterjee et al.
8,498,967 B1 7/2013 Chatterjee et al.
8,522,073 B2 8/2013 Cohen
8,533,406 B2 * 9/2013 Flynn ...................... G06F 1/183 707/692
8,533,527 B2 9/2013 Daikokuya et al.
8,544,029 B2 9/2013 Bakke et al.
8,589,625 B2 11/2013 Colgrove et al.
8,595,455 B2 11/2013 Chatterjee et al.
8,615,599 B1 12/2013 Takefman et al.
8,627,136 B2 1/2014 Shankar et al.
8,627,138 B1 1/2014 Clark et al.
8,650,228 B2 * 2/2014 Wideman .......... G06F 17/30138 707/813
8,660,131 B2 2/2014 Vermunt et al.
8,661,218 B1 2/2014 Piszczek et al.
8,700,875 B1 4/2014 Barron et al.
8,706,694 B2 4/2014 Chatterjee et al.
8,706,914 B2 4/2014 Duchesneau
8,713,405 B2 4/2014 Healey et al.
8,725,730 B2 5/2014 Keeton et al.
8,751,463 B1 * 6/2014 Chamness ......... G06F 17/30153 707/693
8,756,387 B2 6/2014 Frost et al.
8,762,793 B2 6/2014 Grube et al.
8,775,858 B2 7/2014 Gower et al.
8,775,868 B2 7/2014 Colgrove et al.
8,788,778 B1 * 7/2014 Boyle ................. G06F 12/0253 711/155
8,788,913 B1 7/2014 Xin et al.
8,799,746 B2 8/2014 Baker et al.
8,819,311 B2 8/2014 Liao
8,819,383 B1 8/2014 Jobanputra et al.
8,824,261 B1 9/2014 Miller et al.
8,843,700 B1 9/2014 Salessi et al.
8,850,108 B1 9/2014 Hayes et al.
8,850,288 B1 9/2014 Lazier et al.
8,856,593 B2 10/2014 Eckhardt et al.
8,856,619 B1 10/2014 Cypher
8,862,847 B2 10/2014 Feng et al.
8,862,928 B2 10/2014 Xavier et al.
8,868,825 B1 10/2014 Hayes et al.
8,874,836 B1 10/2014 Hayes et al.
8,886,778 B2 11/2014 Nedved et al.
8,898,383 B2 11/2014 Yamamoto et al.
8,898,388 B1 11/2014 Kimmel
8,904,231 B2 12/2014 Coatney et al.
8,918,478 B2 12/2014 Ozzie et al.
8,924,365 B2 * 12/2014 Myers ................. G06F 17/3033 707/691
8,929,066 B2 1/2015 Herman et al.
8,930,307 B2 1/2015 Colgrove et al.
8,930,633 B2 1/2015 Amit et al.
8,949,502 B2 2/2015 McKnight et al.
8,949,555 B1 * 2/2015 Karamcheti ........ G06F 12/0253 711/158
8,959,110 B2 2/2015 Smith et al.
8,977,597 B2 3/2015 Ganesh et al.
9,009,724 B2 4/2015 Gold et al.
9,021,053 B2 4/2015 Bernbo et al.
9,021,215 B2 4/2015 Meir et al.
9,025,393 B2 5/2015 Wu

(56) References Cited

U.S. PATENT DOCUMENTS 9,043,372 B2 5/2015 Makkar et al.
9,053,808 B2 6/2015 Sprouse et al.
9,058,155 B2 6/2015 Cepulis et al.
9,116,793 B2* 8/2015 Kandiraju ........... G06F 12/0246
9,116,819 B2 8/2015 Cope et al.
9,117,536 B2 8/2015 Yoon et al.
9,122,401 B2 9/2015 Zaltsman et al.
9,134,908 B2 9/2015 Horn et al.
9,153,337 B2 10/2015 Sutardja
9,189,650 B2 11/2015 Jaye et al.
9,201,733 B2 12/2015 Verma et al.
9,251,066 B2 2/2016 Colgrove et al.
9,268,806 B1* 2/2016 Kesselman ....... G06F 17/30312
9,298,723 B1* 3/2016 Vincent ............. G06F 17/30156
9,323,667 B2 4/2016 Bennett
9,323,681 B2 4/2016 Apostolides et al.
9,348,538 B2 5/2016 Mallaiah et al.
9,367,397 B1* 6/2016 Xie ..................... G06F 11/1402
9,442,850 B1* 9/2016 Rangarajan ......... H04L 67/2847
9,639,463 B1* 5/2017 Kankani ............. G06F 12/0261
2001/0039181 A1* 11/2001 Spratt ..................... H04W 4/06 455/11.1
2002/0087590 A1* 7/2002 Bacon ................. G06F 12/0261
2002/0138506 A1* 9/2002 Shuf ................... G06F 12/0269
2002/0144059 A1 10/2002 Kendall
2003/0110205 A1 6/2003 Johnson
2003/0191783 A1* 10/2003 Wolczko ............. G06F 12/0261
2004/0039759 A1* 2/2004 Detlefs ............... G06F 12/0276
2004/0040018 A1* 2/2004 Fleming .............. G06F 12/0269 717/162
2005/0149615 A1* 7/2005 Nedimyer ......... G06F 17/30353 709/202
2005/0160227 A1* 7/2005 Todd ................. G06F 17/30085 711/133
2005/0160481 A1* 7/2005 Todd ..................... G06F 21/604 726/30
2005/0235132 A1 10/2005 Karr et al.
2005/0278278 A1* 12/2005 Petev ................ G06F 17/30067
2005/0278460 A1 12/2005 Shin et al.
2006/0015683 A1 1/2006 Ashmore et al.
2006/0174157 A1 8/2006 Barrall et al.
2006/0218266 A1* 9/2006 Matsumoto ........ G05B 19/4185 709/224
2006/0248294 A1 11/2006 Nedved et al.
2007/0079068 A1 4/2007 Draggon
2007/0214194 A1 9/2007 Reuter
2007/0214314 A1 9/2007 Reuter
2007/0268905 A1 11/2007 Baker et al.
2008/0010322 A1* 1/2008 Lee ................... G06F 17/30174
2008/0155191 A1 6/2008 Anderson et al.
2008/0295118 A1 11/2008 Liao
2009/0138654 A1 5/2009 Sutardja
2009/0216910 A1 8/2009 Duchesneau
2009/0217091 A1* 8/2009 Miyamoto .......... G06F 11/1453 714/19
2009/0276478 A1* 11/2009 Soman ................ G06F 12/0276
2010/0017444 A1 1/2010 Chatterjee et al.
2010/0042636 A1 2/2010 Lu
2010/0094806 A1 4/2010 Apostolides et al.
2010/0125695 A1 5/2010 Wu et al.
2010/0162076 A1 6/2010 Sim-Tang et al.
2010/0169707 A1 7/2010 Mathew et al.
2010/0268908 A1 10/2010 Ouyang et al.
2011/0040925 A1 2/2011 Frost et al.
2011/0060927 A1 3/2011 Fillingim et al.
2011/0119462 A1 5/2011 Leach et al.
2011/0219106 A1* 9/2011 Wright .................. G06F 15/173 709/223
2011/0219170 A1 9/2011 Frost et al.
2011/0219205 A1* 9/2011 Wright .................. G06F 15/173 711/206
2011/0225214 A1* 9/2011 Guo ...................... G06F 3/0608 707/813
2011/0238625 A1 9/2011 Hamaguchi et al.
2011/0264717 A1* 10/2011 Grube ................. G06F 11/0727 707/827
2011/0264843 A1 10/2011 Haines et al.
2011/0302369 A1 12/2011 Goto et al.
2012/0011398 A1 1/2012 Eckhardt et al.
2012/0030260 A1* 2/2012 Lu ....................... G06F 11/1453 707/820
2012/0079318 A1 3/2012 Colgrove et al.
2012/0109907 A1* 5/2012 Mandagere ....... G06F 17/30303 707/692
2012/0110249 A1 5/2012 Jeong et al.
2012/0131253 A1 5/2012 McKnight et al.
2012/0159098 A1* 6/2012 Cheung ............... G06F 12/0261 711/162
2012/0191900 A1 7/2012 Kunimatsu et al.
2012/0198152 A1 8/2012 Terry et al.
2012/0203745 A1* 8/2012 Myers ................. G06F 17/3033 707/691
2012/0209943 A1 8/2012 Jung
2012/0226934 A1 9/2012 Rao
2012/0246435 A1 9/2012 Meir et al.
2012/0260055 A1 10/2012 Murase
2012/0311557 A1 12/2012 Resch
2013/0042056 A1 2/2013 Shats et al.
2013/0054540 A1* 2/2013 Factor ............... G06F 17/30159 707/692
2013/0060884 A1 3/2013 Bernbo et al.
2013/0073894 A1 3/2013 Xavier et al.
2013/0124776 A1 5/2013 Hallak et al.
2013/0132800 A1 5/2013 Healey et al.
2013/0151653 A1 6/2013 Sawicki et al.
2013/0151771 A1 6/2013 Tsukahara et al.
2013/0173853 A1 7/2013 Ungureanu et al.
2013/0332648 A1* 12/2013 Kandiraju ........... G06F 12/0246 711/103
2013/0339635 A1 12/2013 Amit et al.
2013/0339729 A1* 12/2013 Novak .................... G06F 21/57 713/167
2014/0025644 A1* 1/2014 Taylor ............... G06F 17/30129 707/690
2014/0040535 A1 2/2014 Lee et al.
2014/0040702 A1 2/2014 He et al.
2014/0047263 A1 2/2014 Coatney et al.
2014/0047269 A1 2/2014 Kim
2014/0064048 A1 3/2014 Cohen et al.
2014/0068224 A1 3/2014 Fan et al.
2014/0136880 A1 5/2014 Shankar et al.
2014/0181402 A1 6/2014 White
2014/0237164 A1 8/2014 Le et al.
2014/0279900 A1* 9/2014 Gupta ............... G06F 17/30309 707/634
2014/0279936 A1 9/2014 Bernbo et al.
2014/0279956 A1* 9/2014 Trimble ................ G06F 3/0641 707/692
2014/0280025 A1 9/2014 Eidson et al.
2014/0359228 A1* 12/2014 Hu ...................... G06F 12/0871 711/136
2014/0365450 A1* 12/2014 Trimble ............ G06F 17/30156 707/692
2014/0372490 A1* 12/2014 Barrus .............. G06F 17/30067 707/814
2014/0376884 A1* 12/2014 Lovell .................. G11B 27/105 386/241
2014/0380125 A1 12/2014 Calder et al.
2014/0380126 A1 12/2014 Yekhanin et al.
2015/0006475 A1* 1/2015 Guo .................. G06F 17/30159 707/609
2015/0032720 A1 1/2015 James
2015/0039645 A1 2/2015 Lewis
2015/0039849 A1 2/2015 Lewis
2015/0058175 A1* 2/2015 Axt .................. H04N 21/44204 705/26.81
2015/0100746 A1 4/2015 Rychlik et al.
2015/0120992 A1* 4/2015 Yamazoe ............ G06F 12/0246 711/103
2015/0134824 A1 5/2015 Mickens et al.

(56) References Cited

U.S. PATENT DOCUMENTS

| | | | | |
|---|---|---|---|---|
| 2015/0169442 | A1* | 6/2015 | Fisher | G06F 12/0253 711/103 |
| 2015/0180714 | A1 | 6/2015 | Chunn et al. | |
| 2015/0212751 | A1* | 7/2015 | Shi | G06F 3/0623 711/103 |
| 2015/0261452 | A1* | 9/2015 | Moon | G06F 3/0616 711/103 |
| 2015/0280959 | A1 | 10/2015 | Vincent | |
| 2015/0324181 | A1* | 11/2015 | Segal | G06F 9/5088 717/178 |
| 2015/0347025 | A1* | 12/2015 | Law | G06F 3/0611 711/103 |
| 2015/0355862 | A1* | 12/2015 | Hayes | G06F 3/0619 711/114 |
| 2016/0019031 | A1* | 1/2016 | Wee | G06F 12/0253 717/114 |
| 2016/0110105 | A1* | 4/2016 | Karamcheti | G06F 3/061 710/302 |
| 2016/0179395 | A1* | 6/2016 | Fisher | G06F 3/0608 711/103 |
| 2016/0232177 | A1* | 8/2016 | Khurange | G06F 12/0253 |
| 2016/0239413 | A1* | 8/2016 | Stephens | G06F 12/0261 |
| 2016/0283372 | A1* | 9/2016 | Davis | G06F 12/0261 |

FOREIGN PATENT DOCUMENTS

| | | |
|---|---|---|
| WO | WO 02-13033 | 2/2002 |
| WO | WO 2008103569 | 8/2008 |
| WO | WO 2008157081 | 12/2008 |
| WO | WO 2013032825 | 7/2013 |

OTHER PUBLICATIONS

Hwang, Kai, et al. "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.

Schmid, Patrick: "RAID Scaling Charts, Part 3:4-128 kB Stripes Compared", Tom's Hardware, Nov. 27, 2007 (http://www.tomshardware.com/reviews/RAID-SCALING-CHARTS.1735-4.html), See pp. 1-2.

Storer, Mark W. et al., "Pergamum: Replacing Tape with Energy Efficient, Reliable, Disk-Based Archival Storage," Fast '08: 6th USENIX Conference on File and Storage Technologies, San Jose, CA, Feb. 26-29, 2008 pp. 1-16.

Ju-Kyeong Kim et al., "Data Access Frequency based Data Replication Method using Erasure Codes in Cloud Storage System", Journal of the Institute of Electronics and Information Engineers, Feb. 2014, vol. 51, No. 2, pp. 85-91.

International Search Report and the Written Opinion of the International Searching Authority, PCT/US2016/016504, dated Jul. 6, 2016.

* cited by examiner

Metadata Table

428

| File Name | Erasure Immunity | Aging Parameter |
|---|---|---|
| 502 File 01.Tmp | No | 0 |
| File 02.Tmp | Yes | 10 |
| ⋮ | | |
| File 11.Obj | No | 0 |
| File 12.Obj | Yes | 4 |
| ⋮ | | |
| File 21.Sim | Yes | 15 |
| File 22.Sim | Yes | 5 |

AGGRESSIVE DATA DEDUPLICATION USING LAZY GARBAGE COLLECTION

BACKGROUND

Solid-state memory, such as flash, is currently in use in solid-state drives (SSD) to augment or replace conventional hard disk drives (HDD), writable CD (compact disk) or writable DVD (digital versatile disk) drives, collectively known as spinning media, and tape drives, for storage of large amounts of data. Flash and other solid-state memories have characteristics that differ from spinning media. Yet, many solid-state drives are designed to conform to hard disk drive standards for compatibility reasons, which makes it difficult to provide enhanced features or take advantage of unique aspects of flash and other solid-state memory. Solid-state storage memory, particularly flash memory, may have limited write and erase cycle endurance, which pose obstacles in the use of solid-state storage memory for backup systems and/or deduplication systems. In addition, some systems or applications create the same or similar files over and over, for example for regression testing, unit testing, or during a synthesis and build process. These systems and applications may also have ineffective data deduplication.

It is within this context that the embodiments arise.

SUMMARY

In some embodiments a method for extending data lifetime for reference in deduplication is provided. The method includes determining that a quantity of user data has at least a threshold amount of data that is re-created in a storage system. The method includes protecting at least portions of the quantity of user data from erasure by garbage collection in the storage system during a predetermined time interval, wherein the protected at least portions are available for data deduplication of further user data in the storage system during the predetermined time interval.

In some embodiments, a deduplication method is provided. The method includes identifying user data having at least a threshold amount of data that is re-created, by one or more applications and writing an indicator to metadata associated with the identified user data, wherein the indicator establishes a time interval of erasure immunity. The method includes preventing at least portions of the user data from being erased during garbage collection, during the time interval in accordance with the indicator in metadata, wherein the at least portions of the identified user data are kept available during the time interval of erasure immunity as reference data for deduplication of further data. Erasure immunity refers to protecting files or blocks from erasure or deletion during garbage collection processes. That is, the files or blocks having erasure immunity are not erased or deleted as the designated files or blocks are protected through a flag setting, or some other suitable mechanism, from deletion during the garbage collection process. In some embodiments the method is embodied as instructions stored on a computer readable medium.

In some embodiments, a storage system, with deduplication is provided. The system includes storage memory and at least one processor of the storage system, configured to write an indicator to metadata of the storage system. The indicator protects at least portions of user data from erasure during garbage collection, for a time interval, responsive to the at least one processor identifying the user data as having at least a threshold amount of data that is re-created on a periodic basis, wherein the at least portions of the user data associated with the indicator are available during the time interval as reference for deduplication.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 6 depicts a metadata table that indicates erasure immunity for specified files and is suitable for identifying specific data to be protected during garbage collection, per the operation shown in FIG. 4 in accordance with some embodiments.

DETAILED DESCRIPTION

Figure 1:
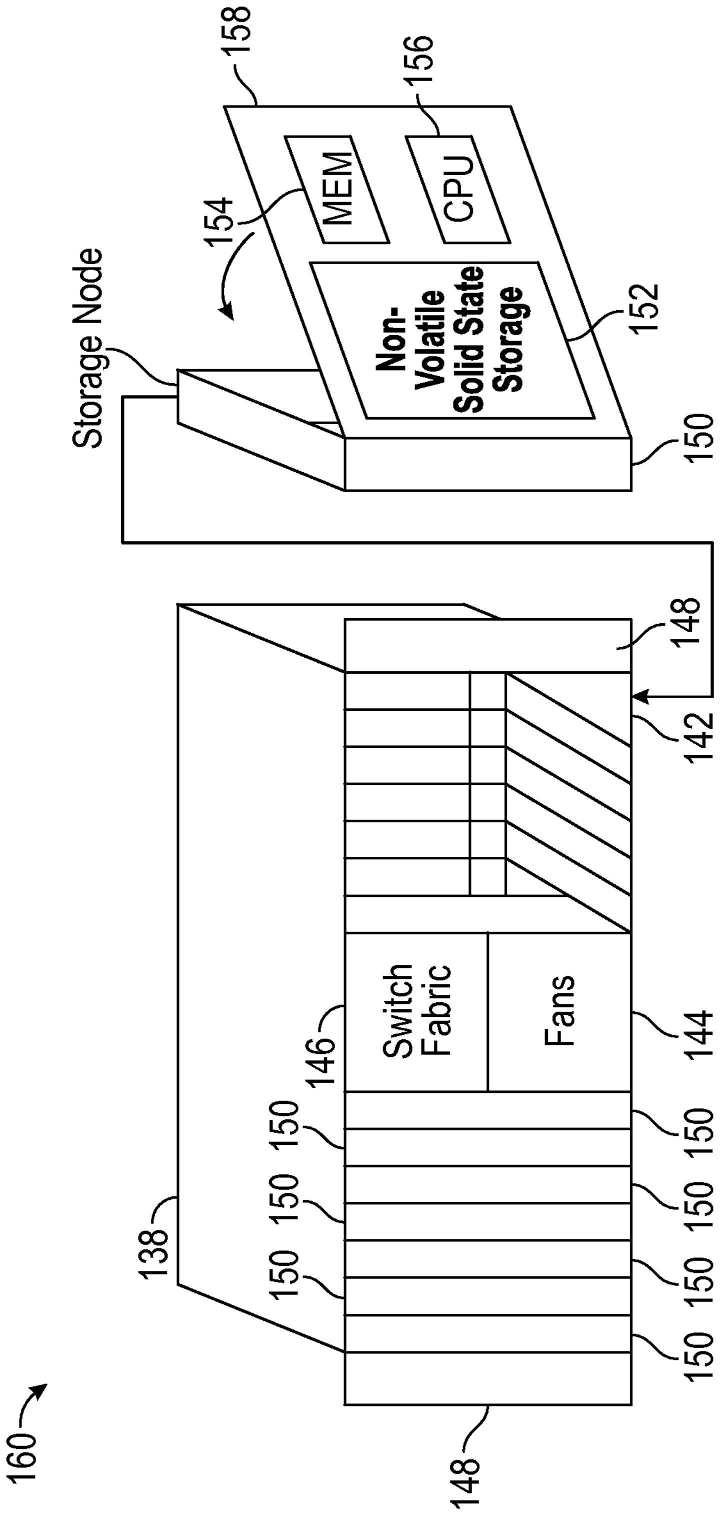
FIG. 1 is a perspective view of a storage cluster with multiple storage nodes and internal storage coupled to each storage node to provide network attached storage, in accordance with some embodiments.

The embodiments below describe a storage cluster that stores user data, such as data originating from one or more users or client systems or other sources external to the storage cluster. Some embodiments of the storage clusters and storage systems are suitable for improvements to deduplication and garbage collection, as described further below. The storage cluster distributes user data across storage nodes housed within a chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster is contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid state memory units, which may be referred to as storage units. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 1, storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2:
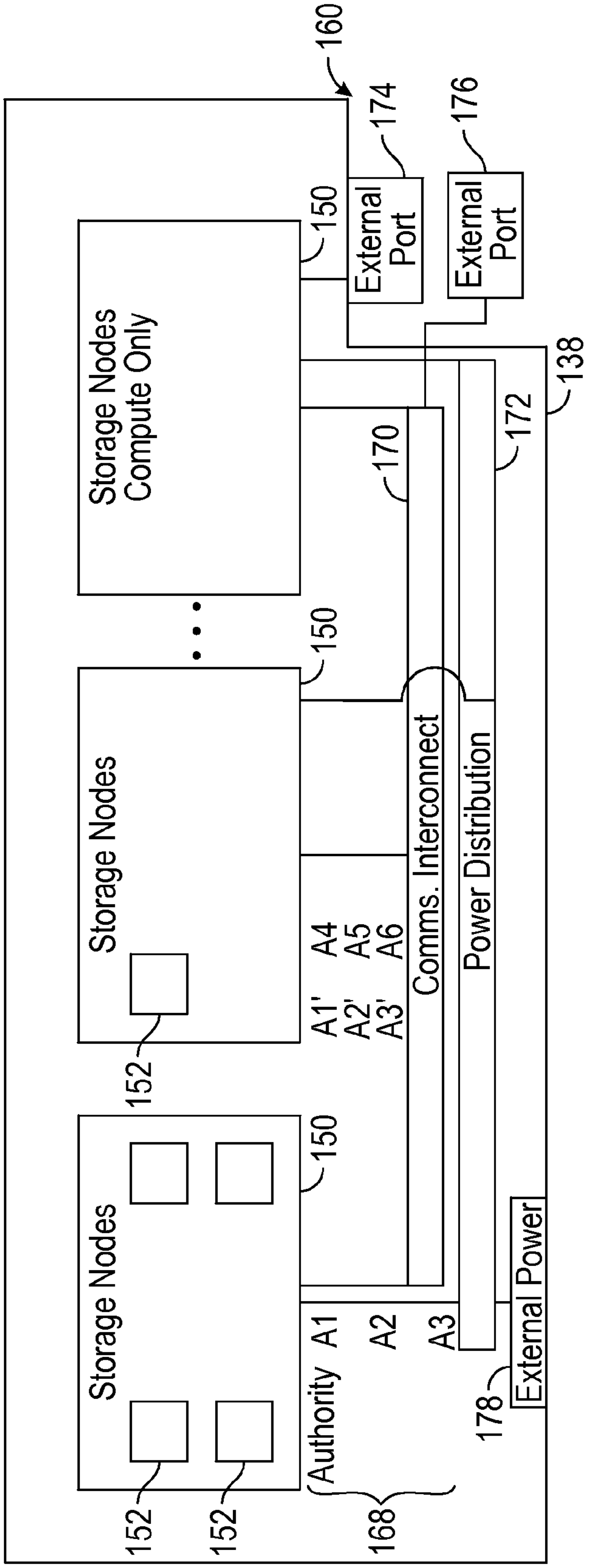
FIG. 2 is a block diagram showing an interconnect switch coupling multiple storage nodes in accordance with some embodiments.

FIG. 2 is a block diagram showing a communications interconnect 170 and power distribution bus 172 coupling multiple storage nodes 150. Referring back to FIG. 1, the communications interconnect 170 can be included in or implemented with the switch fabric 146 in some embodiments. Where multiple storage clusters 160 occupy a rack, the communications interconnect 170 can be included in or implemented with a top of rack switch, in some embodiments. As illustrated in FIG. 2, storage cluster 160 is enclosed within a single chassis 138. External port 176 is coupled to storage nodes 150 through communications interconnect 170, while external port 174 is coupled directly to a storage node. External power port 178 is coupled to power distribution bus 172. Storage nodes 150 may include varying amounts and differing capacities of non-volatile solid state storage 152 as described with reference to FIG. 1. In addition, one or more storage nodes 150 may be a compute only storage node as illustrated in FIG. 2. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to refer to data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 1 and 2, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIG. 5) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority.

The assignment of entities to authorities can be done by pseudorandomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being replicated. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 3:
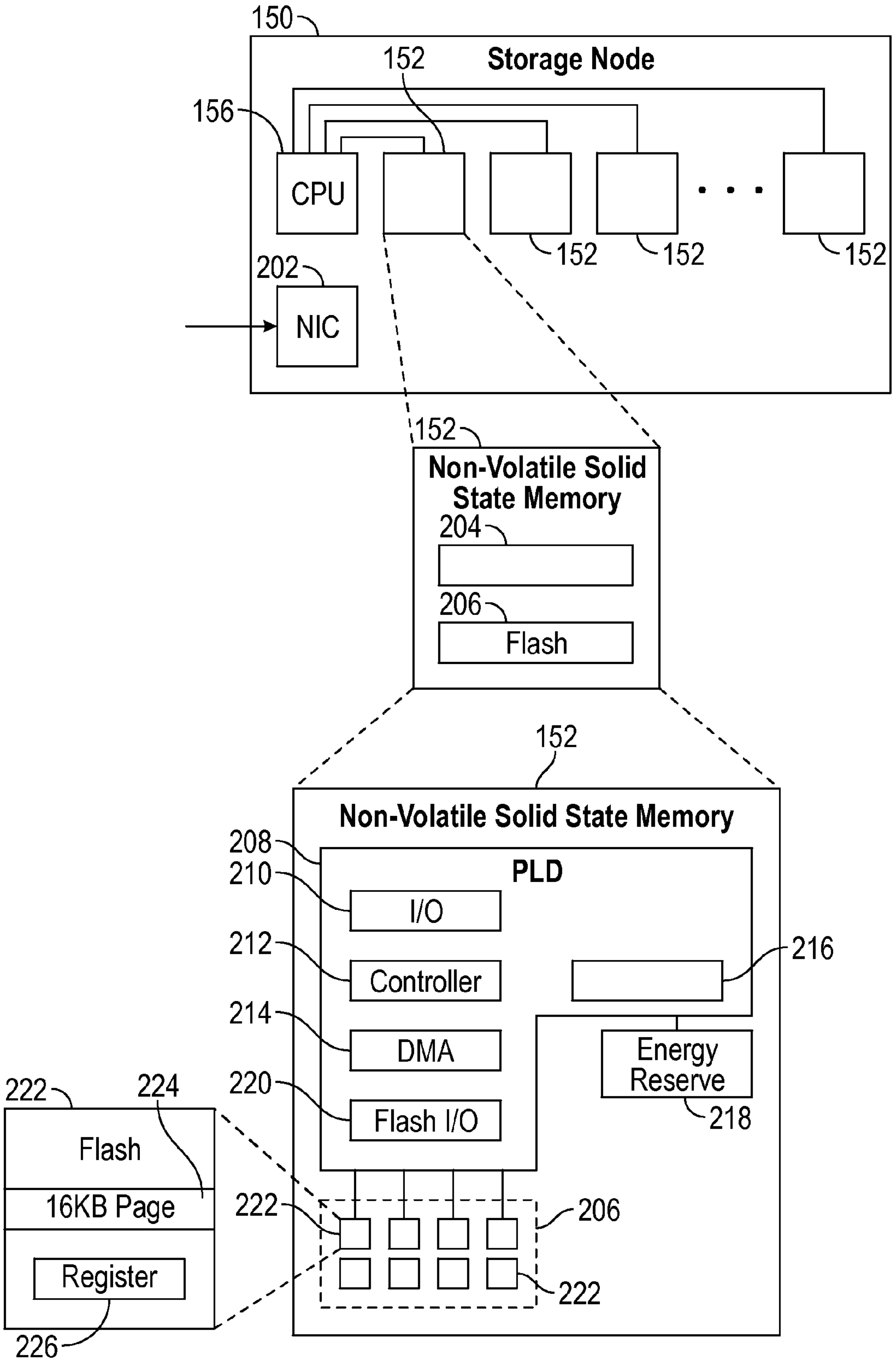
FIG. 3 is a multiple level block diagram, showing contents of a storage node and contents of one of the non-volatile solid state storage units in accordance with some embodiments.

FIG. 3 is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 3, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 3, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 160, in various embodiments as disclosed herein, can be contrasted with storage arrays in general. The storage nodes 150 are part of a collection that creates the storage cluster 160. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 160, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 4:
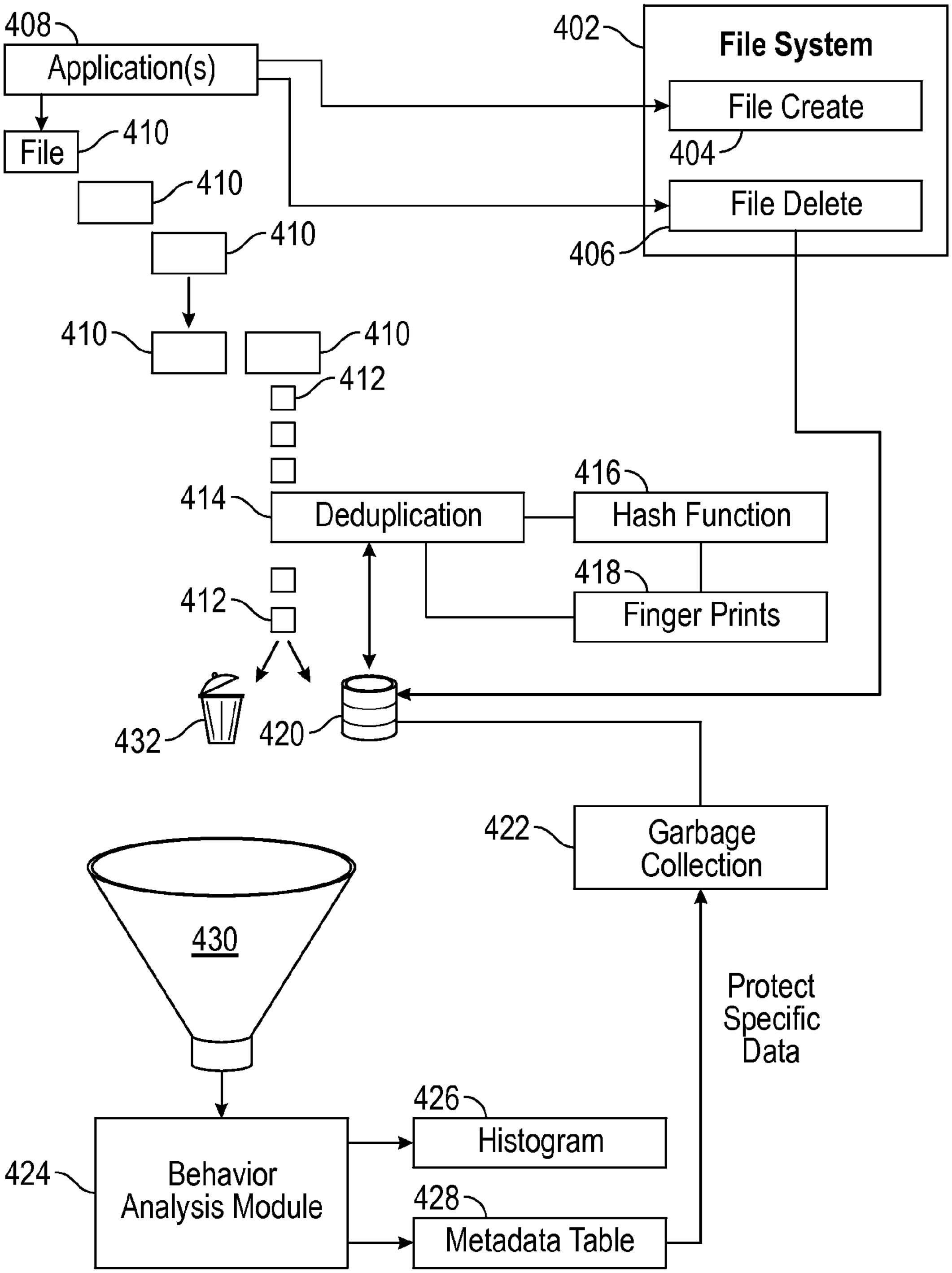
FIG. 4 is a storage system action diagram depicting deduplication of data from files, and garbage collection with specific data protected by erasure immunity, in accordance with some embodiments.

FIG. 4 is a storage system action diagram depicting deduplication 414 of data from files 410, and garbage collection 422 with specific data protected by erasure immunity, in an embodiment of the present disclosure. As mentioned above, erasure immunity refers to protecting files or blocks from erasure or deletion during garbage collection processes. That is, the files or blocks having erasure immunity are not erased or deleted as the designated files or blocks are protected through a flag setting, or some other suitable mechanism, from deletion during the garbage collection process. Deduplication 414 reduces or eliminates redundant or duplicate data, and can be practiced inline (also known as on-the-fly) or post-process. Examples of inline deduplication include deduplication during data creation and data injection (e.g., to a storage system), and deduplication during a backup run. Examples of post-process deduplication include deduplication after data creation or data injection, and deduplication after a backup run. Both types of deduplication may be integrated into the mechanisms described herein. A brief overview of deduplication 414 is given below, followed by description of improvements to deduplication 414 in accordance with present embodiments. It should be appreciated that other deduplication scenarios may benefit from the improvements described herein. In one scenario, one or more applications 408, operating under a file system 402, create files 410. The files 410 are sent for deduplication 414. Deduplication 414 could be inline deduplication of the files 410 as they are created, or as they are sent for storage in a storage cluster 160. In some embodiments the files 410 could be stored in a storage cluster 160, and then subjected to post-process deduplication. The deduplication 414 process typically performs a hash function 416 on each data portion 412, and forms a fingerprint of the data portion 412. The fingerprint is checked against fingerprints 418 of (i.e., that reference) various data portions in a storage 420. If the fingerprint of the data portion 412 matches one of the fingerprints 418, the data portion 412 is discarded (shown symbolically with an arrow pointing towards a trashcan 432). If no match is found for the fingerprint of the data portion 412, the data portion 412 is sent to the storage 420. Various algorithms for maintenance of fingerprints 418, and decisions on how, or how deep, to search for fingerprint matches, are commonly available and can be integrated with the embodiments described. It should be appreciated that data portion 412 may be a file based data portion, object based date portion, or a block based data portion.

A deduplication 414 process references data through multiple techniques or instances. One instance is during the comparison process, in which the deduplication 414 references data using the fingerprints 418 to identify a match to a fingerprint of a data portion 412 under consideration for storage or discarding. A second instance a deduplication 414 process references data is in storage of file links. A deduplicated file is represented as a set of references to data portions and stored as a series of links to data portions. These links can reference unique data portions 412 in the storage 420, or data portions 412 that have multiple references as a result of matching data portions 412 that were discarded. A third instance a deduplication 414 process references data is when a file is reconstructed from the series of links, and the deduplication 414 process locates the referenced data portions 412 and reassembles a file, e.g., in a file restoration process from a backup image. In some embodiments, reference data as used herein may refer to any of the data, i.e., fingerprints, file links, reassembled files, objects, etc., used in the deduplication techniques or instances mentioned in this paragraph.

Continuing with the scenario of FIG. 4, an application 408 uses the file create 404 process of the file system 402 in order to create a file 410, and uses the file delete 406 process of the file system 402 in order to delete a file 410. In a storage system, such as the storage cluster 160 described with reference to FIGS. 1-3, a garbage collection 422 process identifies memory locations in the storage 420, for which the file system 402 says the data no longer exists. For flash memory, the garbage collection 422 would erase blocks of flash, under such circumstances (except as described below, per erasure immunity). In other words, if a file has been deleted, it is normally acceptable for the garbage collection 422 process to erase corresponding flash memory blocks, or otherwise arrange for reuse of memory corresponding to the no longer existing data. That is, since the file or block no longer exists and there are no other references to that data by other files or blocks and thus it is a candidate for immediate garbage collection. The embodiments exploit temporal locality of recreating that data to prevent garbage collection from reclaiming the data blocks, reducing flash wear and extending the lifetime of the flash media. It should be appreciated that the particulars of garbage collection 422 are specific to an architecture, a storage memory type, and other system aspects. In addition, while the embodiments have provided examples referring to files and file systems, the embodiments may be extended to object or block based systems also.

Garbage collection 422 can be problematic for deduplication 414, in systems where the same or similar files are created multiple times. This can happen in systems built for regression testing, unit testing, or synthesis and build processes. In these systems, files, objects, or blocks are created by certain applications 408 on a regular or irregular basis and many such files, objects, or blocks have a large amount of data that is identical to data in previously seen files, objects, or blocks, i.e., the data is re-created. For example, temporary files, object files, simulation files and other files, objects, or blocks associated with the above-described uses can be created on a weekly, daily, or even multiple times daily basis, and many of these files, objects, or blocks have data that is repeated from the previous run(s), i.e., re-created data. In some embodiments with respect to block based systems, logical block addresses may be repeatedly used in the system. If each of these runs is deduplicated, and garbage collection 422 is applied, the same data gets erased, rewritten, erased and rewritten many times over the course of months or a year or some other time period. This situation is not only inefficient from a standpoint of system activity and time, but may result in rapid or premature wear of flash memory or other storage memory types with wear limitations.

Still referring to FIG. 4, improvements to the garbage collection 422 process include identifying and protecting specific data, by granting erasure immunity for an erasure immunity time interval. The system is observed (depicted symbolically as a funnel 430 collecting observations about the applications 408 and the file system 402) by a behavior analysis module 424. The behavior analysis module 424 could be implemented as software, firmware, hardware, or combinations thereof, for example on one or more storage nodes 150, or on one or more compute-only nodes, in the storage cluster 160. The behavior analysis module 424 produces a histogram 426 or other data structure, which tracks file and data behavior as will be further described with reference to FIG. 5. File names or file types that are repeated, or that have greater than a specified amount of repeated previously seen data, are detected by the behavior analysis module 424, for example through analysis of the histogram 426 or other data structure. The behavior analysis module 424 then writes to a metadata table 428, as will be further described with reference to FIG. 6. The metadata table 428 indicates which files have erasure immunity and should be protected during garbage collection 422. Files with large amounts of re-created data, i.e., new files in which data from previously seen files is repeated in the new files, are candidates for erasure immunity during garbage collection 422. When garbage collection 422 is performed, files with erasure immunity are not erased, even if the file system 402 indicates these files have been deleted and are no longer in existence. In variations, erasure immunity could be granted for blocks, or other amounts of data. The files, blocks or other portions of data that are granted erasure immunity are kept available during the erasure immunity time interval as reference data for deduplication of further data.

Figure 5:
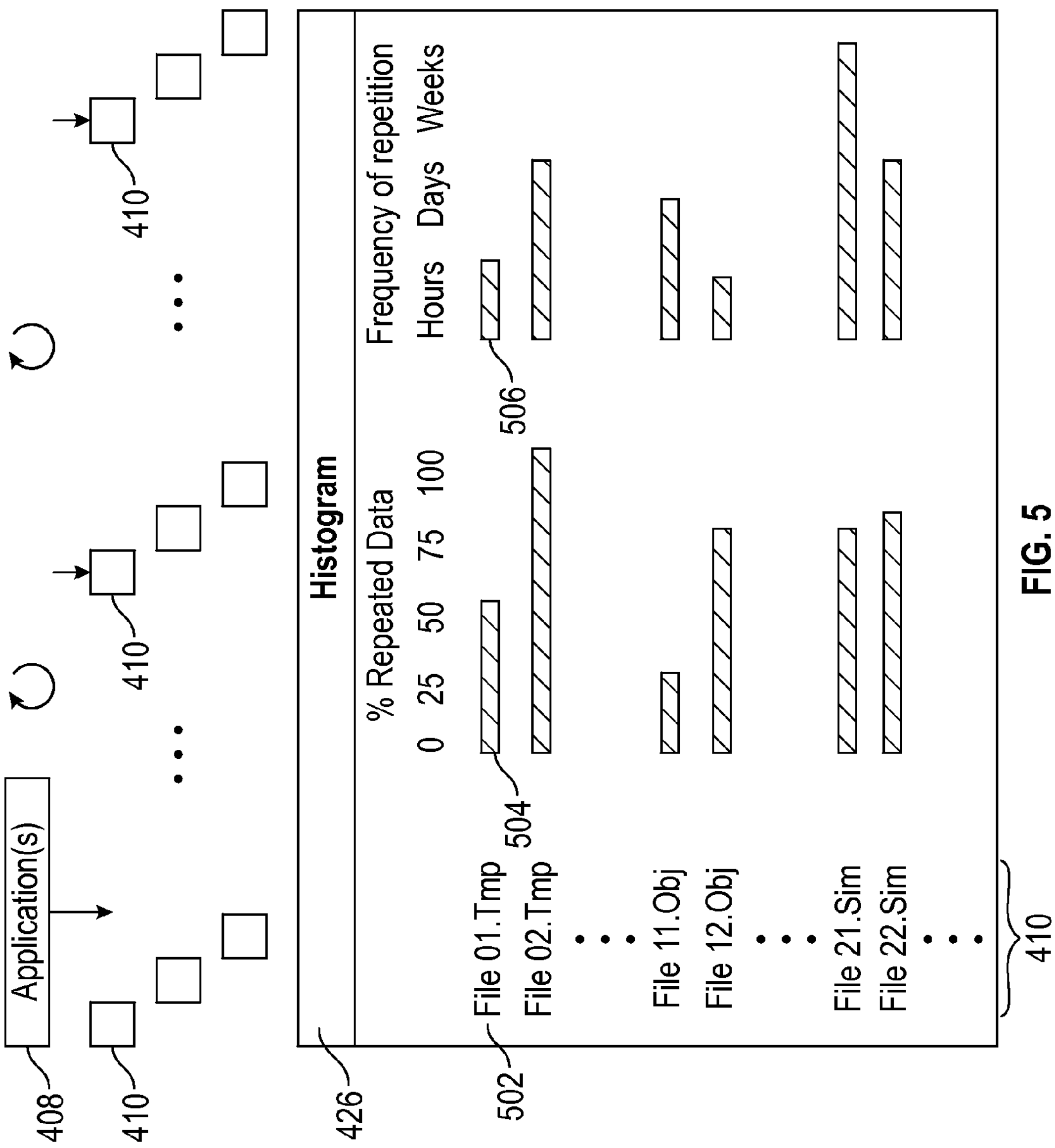
FIG. 5 depicts a histogram or other data structure that shows repeated data in files and is suitable for identifying specific data to be protected during garbage collection, per the operation shown in FIG. 4 in accordance with some embodiments.

FIG. 5 depicts a histogram 426 or other data structure that shows repeated data in files 410 and is suitable for identifying specific data to be protected during garbage collection 422, per the operation shown in FIG. 4. Format for such a data structure is readily devised, and need not be identical to the representation in FIG. 5. The application(s) 408 are shown creating files 410 on a repeated basis, for purposes of illustration of the contents of the histogram 426. In one embodiment, file names 502 are listed in the histogram 426. For each file name 502, a first indication 504 shows the amount of repeated (i.e., recurring, re-created) data in the file. That is, the contents of the file are compared to previously seen files, and the amount of re-created or repeated data in the file is noted in the histogram 426. This comparison could be made with use of the hash function 416, the fingerprints 418, or other comparison mechanism or utility. For each file name 502, a second indication 506 illustrates the frequency of repetition of the file. For example, the first entry in the histogram 426 shows a file with a file name 502 "FILE01.TMP". This file has about 50% repeated (i.e., re-created) data, and the file is created on a frequency of repetition of every few hours. Although shown in graphical format, the first and second indications 504, 506 could be in numerical format in some embodiments. Example file types that could have re-created data include temporary files (.TMP), object files (.OBJ) and simulation files (.SIM), among others. The value of the threshold, for the amount of data that is re-created or repeated, could be adjusted based on the histogram 426, or based on utilization ratios of storage memory, i.e., utilization of storage capacity of the storage system.

FIG. 6 depicts a metadata table 428 that indicates erasure immunity 602 for specified files and is suitable for identifying specific data to be protected during garbage collection, per the operation shown in FIG. 4. For example, the behavior analysis module 424 could grant erasure immunity 602, e.g., as shown with the entry "yes" in the metadata table 428, to files having greater than 50% repeated data (or meeting some other threshold). In various embodiments, the metadata table 428 could be a separate table or could be integrated into a fingerprint table, e.g., with fingerprints 418 as shown in FIG. 4. In one embodiment, fingerprints 418 associated with a file that is granted erasure immunity also have erasure immunity. An aging parameter 604 is established in the metadata table 428, in some embodiments. For example, the behavior analysis module 424 could establish a lower aging parameter 604 for files found to have a rapid frequency of repetition (e.g., in hours or days), and a higher aging parameter 604 for files found to have a lower frequency of repetition (e.g., in days or weeks) and thus in need of a longer extended lifetime or lifespan. The aging parameter 604 could be decremented (i.e., counted down) at regular time spans (e.g., once per hour, once per day, or once per week) in some embodiments, or with each garbage collection 422 cycle, or with each deduplication 414 cycle, in other embodiments. In this manner, the combination of the erasure immunity 602 and the aging parameter 604 establishes an extended lifetime for specified files 410, according to the file names 502. Alternative parameters to an aging parameter may be incorporated into the embodiments and these parameters may be combined with the aging parameter or utilized in place of the aging parameter. For example, a parameter such as a block size, object size or file size may be used as a tiebreaker to prioritize one block, object or file over another block, object or file where 2 blocks, objects or files have the same aging parameter. Thus, the embodiments are not limited to an aging parameter or a single parameter, as a combination of features that can include age, size, etc., may be integrated with the embodiments to prioritize or function as a tie breaker in some embodiments. The extended lifetime grants erasure immunity to a file during garbage collection 422, regardless of whether or not the file system 402 declares the file has been deleted. The extended lifetime is valid until the lifetime expires in some embodiments. In some embodiments, the extended lifetime can be renewed. For example, the behavior analysis module 424 could track file creation and deletion patterns, allowing extended lifetimes to expire after a specified number of dead cycles in which a file creation and deletion pattern ceases, but renew appropriate extended lifetimes if the file creation and deletion pattern resumes. The behavior analysis module 424 could have awareness of calendars (e.g., weekends, holidays, plant shutdowns) and apply this in determining extended lifetimes or expirations thereof. Thus, in various embodiments, depending upon sophistication of the algorithm, the time interval for erasure immunity of data could be a fixed time interval, or a variable one. In some embodiments, the erasure immunity time interval, whether fixed or variable, is adjusted based on the amount of storage capacity utilized. For example, as storage capacity utilization increases, the erasure immunity time interval could be decreased, so as not to overflow the storage capacity. For situations in which there is a relatively low storage capacity utilization, a longer erasure immunity time interval could be used. In some embodiments related to write rates, if the write rate is very low, then garbage collection is less likely to be activated, whereas relatively high write rates, even in low capacity results in a garbage collection mechanism that is more active and requires more management.

Figure 7:
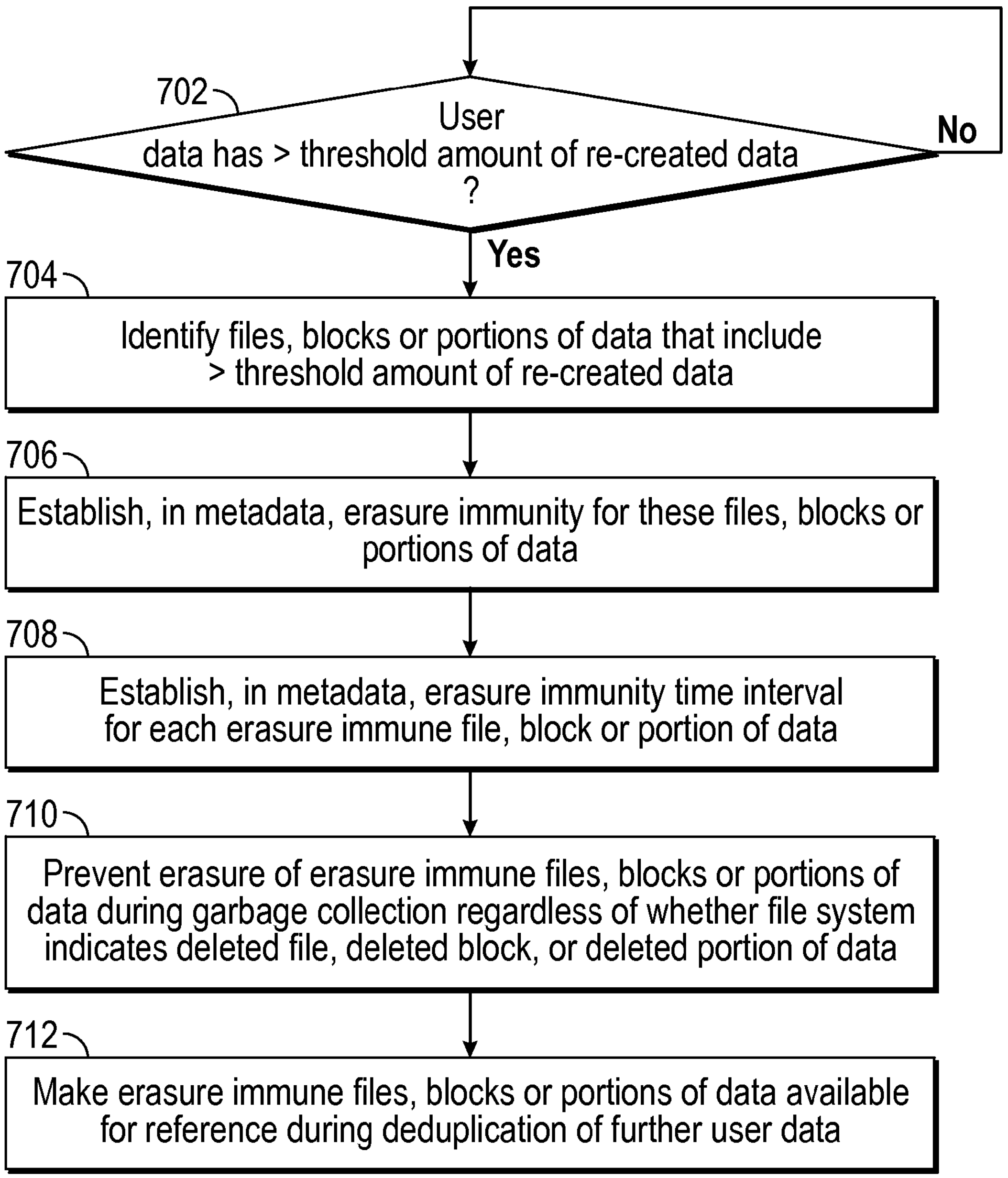
FIG. 7 is a flow diagram of a method for extending data lifetime for reference in deduplication, which can be practiced using embodiments of storage nodes, storage units and storage clusters as shown in FIGS. 1-3, and embodiments of the system of FIGS. 4-6 in accordance with some embodiments.

FIG. 7 is a flow diagram of a method for extending reference data lifetime in a deduplication mechanism, which can be practiced using embodiments of storage nodes, storage units and storage clusters as shown in FIGS. 1-3, and embodiments of the system of FIGS. 4-6. The method can be practiced by one or more processors, such as processors of storage nodes, storage units or compute nodes. In a decision action 702, it is determined whether user data has greater than a threshold amount of re-created data. As noted above, the user data may be any data from a client or source external to the storage system in some embodiments, which includes meta data. Re-created data refers to data that is repeated in files as described above. If the user data does not have greater than a threshold amount of re-created data, flow loops back to the decision action 702 (or could branch elsewhere for further processes). If the user data does have greater than a threshold amount of re-created data, flow proceeds to the action 704. In the action 704, files, blocks or portions of data that include greater than a threshold amount of re-created data are identified. These files, blocks or portions of data are granted erasure immunity, which is established in metadata, in an action 706. Each of these erasure immune files, blocks or portions of data are granted an erasure immunity time interval, which is also established in metadata, in an action 708. Regardless of whether the file system indicates a deleted file, a deleted block, or a deleted portion of data, erasure of the erasure immune files, blocks or portions of data is prevented during garbage collection, in an action 710. That is, there are no other copies of the data for that data to be garbage collected. The erasure immune files, blocks or portions of data are made available for reference during deduplication of further user data, in an action 712.

Figure 8:
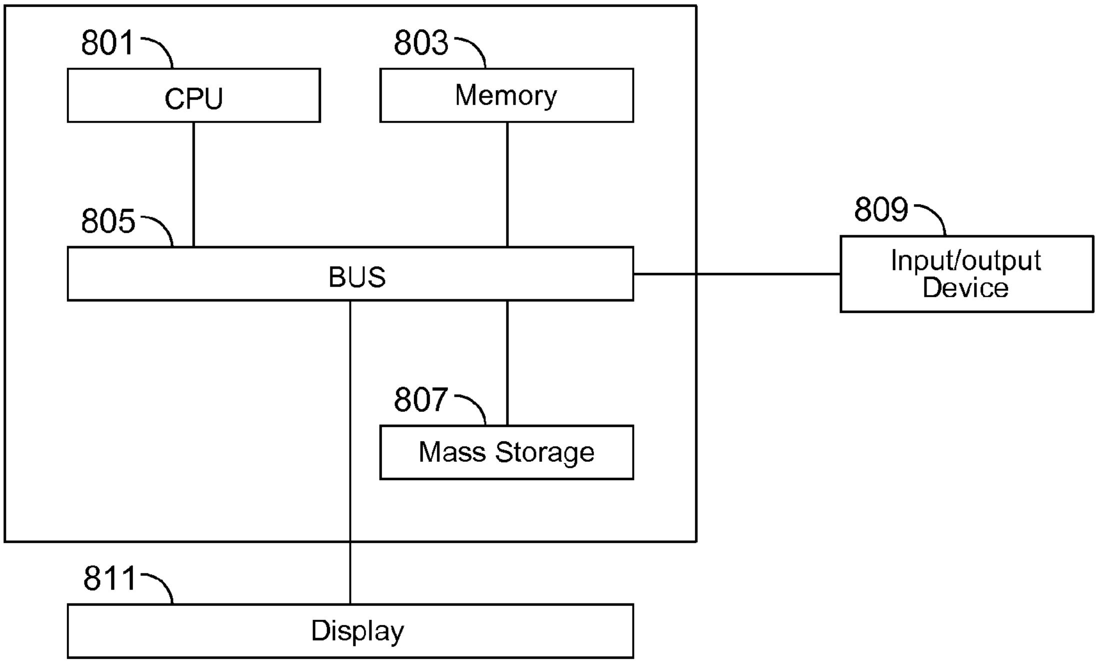
FIG. 8 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 8 is an illustration showing an exemplary computing device which may implement the embodiments described herein. The computing device of FIG. 8 may be used to perform embodiments of the functionality for a storage node or a non-volatile solid state storage in accordance with some embodiments. The computing device includes a central processing unit (CPU) 801, which is coupled through a bus 805 to a memory 803, and mass storage device 807. Mass storage device 807 represents a persistent data storage device such as a disc drive, which may be local or remote in some embodiments. The mass storage device 807 could implement a backup storage, in some embodiments. Memory 803 may include read only memory, random access memory, etc. Applications resident on the computing device may be stored on or accessed via a computer readable medium such as memory 803 or mass storage device 807 in some embodiments. Applications may also be in the form of modulated electronic signals modulated accessed via a network modem or other network interface of the computing device. It should be appreciated that CPU 801 may be embodied in a general-purpose processor, a special purpose processor, or a specially programmed logic device in some embodiments.

Display 811 is in communication with CPU 801, memory 803, and mass storage device 807, through bus 805. Display 811 is configured to display any visualization tools or reports associated with the system described herein. Input/output device 809 is coupled to bus 805 in order to communicate information in command selections to CPU 801. It should be appreciated that data to and from external devices may be communicated through the input/output device 809. CPU 801 can be defined to execute the functionality described herein to enable the functionality described with reference to FIGS. 1-7. The code embodying this functionality may be stored within memory 803 or mass storage device 807 for execution by a processor such as CPU 801 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), storage area network, read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for extending reference data lifetime in deduplication, comprising:

determining that a quantity of user data has at least a threshold amount of data that is re-created in a storage system;

protecting at least portions of the quantity of user data from erasure by garbage collection in the storage system during a predetermined time interval, wherein the protected at least portions are available for deduplication of further user data in the storage system during the predetermined time interval; and performing garbage collection, which includes erasing portions of storage memory of the storage system, corresponding to files that the storage system considers no longer in existence, except where metadata prevents the erasure during the garbage collection.

2. The method of claim 1, wherein the determining comprises:

forming a data structure, over one or more sampling windows of time, of data of the storage system, the data structure indicating amounts of the data of files or blocks in the storage system having hash function results matching hash function results of at least one other file or block seen during the one or more sampling windows of time.

3. The method of claim 1, wherein the protecting is based on metadata that includes an aging parameter for each of the at least portions of the quantity of user data, and further comprising:

setting the aging parameter for one of the at least portions of the quantity of user data to a first value, responsive to determining the one of the at least portions matches a fingerprint result of a file or block seen during a sampling window of time, wherein the first value indicates to not erase during garbage collection; and adjusting the aging parameter for a further one of the at least portions of the quantity of user data to a second value, responsive to determining the further one of the at least portions has a fingerprint result unmatched by files or blocks seen during the sampling window of time, wherein the second value indicates to erase during garbage collection.

4. The method of claim 1, further comprising:

performing garbage collection, which includes erasing a plurality of fingerprints not matched in at least one deduplication operation, except where a fingerprint, corresponding to one of the at least portions of the quantity of user data is protected from erasure.

5. The method of claim 1, wherein the determining is on a basis of a file, a file type, a block or a range of blocks, and wherein the threshold amount of data is one or more times as much as a data chunk corresponding to a fingerprint or a hash function result.

6. The method of claim 1, further comprising:

establishing in metadata that at least portions of the quantity of user data are to have erasure immunity in the storage system for the predetermined time interval; and writing to a table in the storage system, regarding how often incoming data to the storage system re-creates a same data or includes greater than the threshold amount of data that is re-created.

7. A deduplication method comprising:

identifying user data having at least a threshold amount of data that is re-created, by one or more applications;

writing an indicator to metadata associated with the identified user data, wherein the indicator establishes a time interval of erasure immunity;

preventing at least portions of the user data from being erased during garbage collection, during the time interval in accordance with the indicator, wherein the at least portions of the identified user data are kept available during the time interval of erasure immunity as reference data for deduplication of further data;

generating a histogram tracking re-creation of files or blocks over one or more sampling windows of time; and adjusting a value of the threshold amount based on the histogram.

8. The method of claim 7, further comprising:

setting an aging parameter of the indicator in metadata at a start of the time interval; and adjusting the aging parameter towards allowance of erasure, responsive to one of completing a cycle of garbage collection or a passage of time.

9. The method of claim 7, further comprising:

tracking one of file creation, file deletion, block creation, block deletion, object creation, object deletion or frequency of re-creation of data, in a metadata table; and adjusting the time interval based on the tracking.

10. The method of claim 7, further comprising:

adjusting a value of the threshold amount, based on utilization of storage capacity of the storage system.

11. The method of claim 7, further comprising:

performing garbage collection, to erase portions of storage memory of the storage system except where the indicator establishes the time interval of erasure immunity for the at least portions of the identified user data.

12. A storage system, comprising:

storage memory;

at least one processor of the storage system, configured to write an indicator to metadata of the storage system, the indicator protecting at least portions of user data from erasure during garbage collection, for a time interval, responsive to the at least one processor identifying the user data as having at least a threshold amount of data that is re-created on a periodic basis, wherein the at least portions of the user data associated with the indicator are available during the time interval as a reference for deduplication, and wherein the at least one processor is configured to execute a garbage collection process, which includes erasing portions of storage memory of the storage system, corresponding to files that the storage system considers no longer in existence, except where metadata prevents the erasure during the garbage collection.

13. The storage system of claim 12, further comprising:
the at least one processor configured to generate a data structure of user data over time, the data structure indicating at least one of: frequency of re-creation of data or amount of re-created data, wherein the identifying is based on the data structure.

14. The storage system of claim 12, further comprising:
the at least one processor configured to monitor amount of storage capacity of the storage memory utilized and to adjust the time interval or a value of the threshold amount based on the amount of storage capacity utilized.

15. The storage system of claim 12, further comprising:
the indicator including an aging parameter;
the at least one processor configured to adjust the aging parameter towards a first value, responsive to the identifying, wherein the first value prevents the erasure during garbage collection; and
the at least one processor configured to adjust the aging parameter towards a second value, responsive to one of passage of time or completion of a garbage collection cycle, wherein the second value allows the erasure during garbage collection.

16. The storage system of claim 12, further comprising:
the at least one processor configured to perform in-line deduplication on data arriving for storage in the storage memory, with reference to the at least portions of the user data associated with the indicator.

17. The storage system of claim 12, further comprising:
the at least one processor configured to perform post-process deduplication on data stored in the storage memory, with reference to the at least portions of the user data associated with the indicator.

18. The storage system of claim 12, further comprising:
the at least one processor configured to perform a hash function on data arriving for storage in the storage memory or data stored in the storage memory, wherein the identifying is based on results of the hash function.

* * * * *